United States Patent [19]

Stager

[11] 4,119,973

[45] Oct. 10, 1978

[54] FAULT DETECTION AND COMPENSATION CIRCUIT FOR INK JET PRINTER

[75] Inventor: William R. Stager, Fairborn, Ohio

[73] Assignee: The Mead Corporation, Dayton, Ohio

[21] Appl. No.: 831,094

[22] Filed: Sep. 6, 1977

[51] Int. Cl.[2] .............................................. G01D 18/00

[52] U.S. Cl. ........................................................ 346/75

[58] Field of Search ........................................... 346/75

[56] References Cited

U.S. PATENT DOCUMENTS

| | | | |
|---|---|---|---|
| 3,701,998 | 10/1972 | Mathis | 346/75 |
| 3,911,445 | 10/1975 | Foster | 346/75 X |
| 4,007,463 | 2/1977 | Fujimoto | 346/75 |

*Primary Examiner*—Joseph W. Hartary

*Attorney, Agent, or Firm*—Biebel, French & Nauman

[57] ABSTRACT

An ink jet printer includes a deflection electrode for providing a deflection field, which field will deflect charged ink drops. The power supply and control circuit for the deflection electrode includes a capacitor storage arrangement in which a brief short between the deflection electrode and adjacent structure will be compensated by a capacitance which is switched into electrical connection with the deflection electrode only during deflection electrode shorts. The control circuit also monitors the deflection electrode potential and if an electrode short which reduces the electrode potential substantially persists for a period greater than a preselected period of time, the printer will be disabled and printing operations terminated.

9 Claims, 5 Drawing Figures

FAULT DETECTION AND COMPENSATION CIRCUIT FOR INK JET PRINTER

BACKGROUND OF THE INVENTION

This invention relates generally to the field of jet drop recording and, more particularly, to jet drop recorders of the type shown in U.S. Pat. No. 3,373,433, issued Mar. 12, 1968, to Sweet et al, and U.S. Pat. No. 3,701,998, issued Oct. 31, 1971, to Mathis. In recorders of this type, one or more orifices receive an electrically conductive recording fluid, such as a water base ink, from a pressurized fluid supply manifold and eject the recording fluid in parallel streams of ink drops. The production of drops is typically facilitated by mechanical stimulation of the orifice structure or of the recording fluid in the manifold. Graphic reproduction is accomplished by selectively charging and deflecting the drops in each of the streams and, thereafter, depositing at least some of the drops on a print medium, such as a moving web of paper. The drops which are not deposited on the moving web are caught by an appropriately positioned catcher.

Typically, the drops in each of the streams are deflected by a deflection field which is generated by a deflection electrode having a deflection potential impressed thereon. The catcher structure may typically be grounded and may be positioned on the opposite side of the stream or streams from the deflection electrode. Various deflection electrode configurations have been used. Where the orifices are positioned in two parallel rows, a thin ribbon-like electrode structure which extends between the rows of drop streams may be used. Positioned outwardly from the deflection ribbon are two catchers. The deflection potential applied to the ribbon will be of the same polarity as the charge carried by the charged drops in the drop streams. The charged drops will, therefore, be deflected outwardly away from the deflection ribbon and toward the catchers.

The environment in which ink jet printers of the type described above operate may present problems with respect to electrical isolation of the ink jet printer component parts. If the printing is accomplished on a rapidly moving web of paper, as is typical, the movement of the paper will result in air turbulence in the vicinity of the deflection ribbon and catchers and this air may have a high particle content. Particles both from the paper stock and other contaminant sources may therefore find their way into the printer. When this occurs, the deflection ribbon, bearing a deflection potential of approximately-1100 volts, may arc or short to other printer components which are operating at differing electrical potentials.

Typically, jet printers of this type have printed with uncharged drops and deflected charged drops to the catchers. If the deflection ribbon is grounded and the deflection field collapses, however, even the drops which are intended to be deflected to the catchers will pass between the deflection ribbon and the catchers and will be deposited on the print medium. It can be seen, therefore, that the shorting of the deflection ribbon may result in a substantial quantity of ink being deposited upon the print medium. In the case of a paper print web, this ink deposit may flood the web, dampening it to the point where the web will break. Should this occur, a substantial period of time will be required for cleanup and restarting operations. It has been common practice, therefore, for the printers to be shut down automatically at the initial detection of a printer short to prevent such situations. In a relatively dirty operating environment, bar shorts may occur frequently, causing the jet printer to be shut down an inordinate number of times and thereby reducing operating efficiency.

SUMMARY OF THE INVENTION

A computer controlled ink jet printer includes a deflection electrode to which is applied a deflection potential, creating an electric field for deflection of charged ink drops. A circuit for providing the deflection potential to the deflection electrode and for monitoring the operation of the electrode includes a means for providing a deflection voltage to the deflection electrode and a capacitor means which is connected to the deflection electrode for providing an additional potential source for the deflection electrode in the event of a short from the deflection electrode to the ground. The circuit further includes a deflection electrode potential monitor which monitors the deflection electrode potential and which provides an output signal in response to the reduction of the deflection electrode potential below a predetermined potential level. A delay means is responsive to the deflection electrode monitor means for providing a signal to the computer indicating a drop in the deflection electrode potential below the predetermined potential which drop lasts for a preselected period of time. A computer interface means is provided for applying control signals to the means for providing the deflection electrode deflection potential such that it will then be disabled.

Accordingly, it is an object of the present invention to provide an ink jet printer having an improved deflection electrode voltage supply and monitor circuit in which a capacitor circuit is connected in parallel with a voltage supply circuit when the deflection potential of the deflection electrode is reduced, for providing an additional controlled source of deflection potential; to provide such a printer in which the deflection electrode potential is monitored; to provide such a printer in which the reductions in deflection electrode potential occurring during printer operation are timed and the controlling computer signaled to shut down the printer upon a reduction in deflection potential lasting for a preselected time period.

Other objects and advantages of the invention will be apparent from the following description, the accompanying drawings and the appended claims.

DETAILED DESCRIPTION OF THE PREFERRED EMBODIMENT

Figure 1:
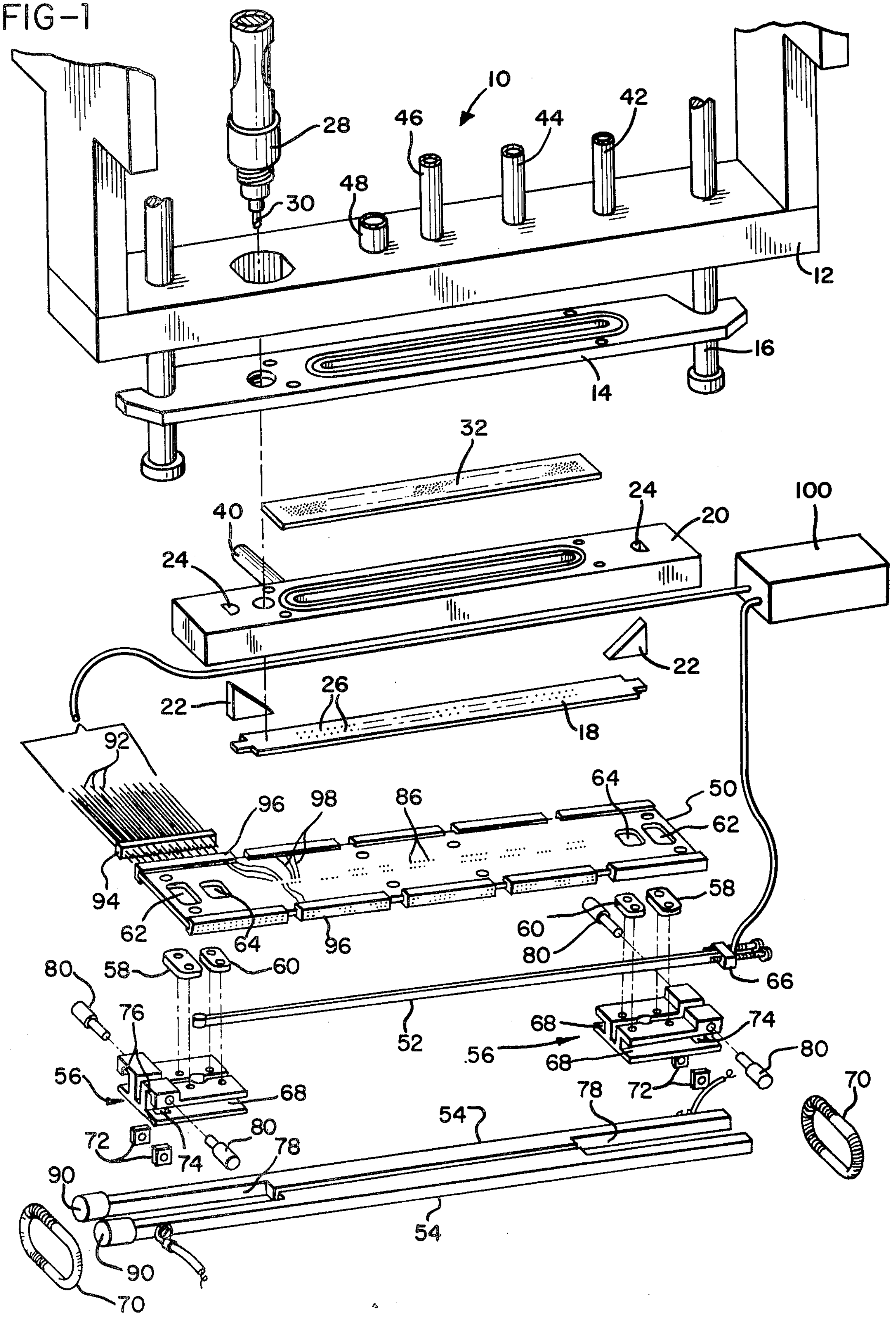
FIG. 1 is an exploded perspective view of an ink jet recording head of the type used in the present invention.

FIG. 1 is an exploded perspective view of an ink jet printer of the type used in the present invention. The various elements of a head assembly 10 are assembled for support by a support bar 12. Assembly thereto is accomplished by attaching the elements by means of machine screws (not shown) to a clamp bar 14 which is in turn connected to the support bar 12 by means of clap rods 16.

The recording head includes an orifice plate 18 soldered, welded or otherwise bonded to fluid supply manifold 20 with a pair of wedge-shaped acoustical dampers 22 therebetween. Orifice plate 18 is preferably formed of a relatively stiff material such as stainless steel or nickel coated beryllium-copper but is relatively thin to provide the required flexibility for direct contact stimulation. Preferably dampers 22 are cast in place by pouring polyurethane rubber or other suitable damping material through openings 24 while tilting manifold 20 (orifice plate 18 being attached) at an appropriate angle from the vertical. This is a two step operation as dampers 22 require tilting in opposite directions.

Orifice plate 18 contains two rows of orifices 26 and is preferably stimulated by a stimulator 28 which is threaded into clamp bar 14 to carry a stimulation probe 30 through the manifold 20 and into direct contact with plate 18. Orifice plate 18, manifold 20, clamp bar 14 together with a filter plate 32 and appropriate O rings comprise a clean package which may be preassembled and kept closed to prevent dirt or foreign material from reaching and clogging orifices 26. Conduit 40 may be provided for flushing of the clean package. Service connections for the recording head include a coating fluid supply tube 42, air exhaust and inlet tubes 44 and 46, and a tube 48 for connection to a pressure transducer (not shown).

Other major elements comprising the recording head are a charge ring plate 50, an electrically conductive deflection electrode such as ribbon 52 and a pair of catchers 54. Catchers 54 are supported by holders 56 which are fastened directly to fluid supply manifold 20. Spacers 58 and 60 reach through apertures 62 and 64, respectively in charge ring plate 50 to support holders 56 without stressing or constraining charge ring plate 50. Deflection ribbon 52 is also supported by holders 56 and is stretched tightly therebetween by means of tightening block 66. Ribbon 52 extends between catchers 54.

Catchers 54 are laterally adjustable relative to ribbon 52. This adjustability is accomplished by assembling the head with catchers 54 resting in slots 68 of holders 56, and urging them mutually inward with a pair of elastic bands 70. Adjusting blocks 72 are inserted upwardly through recesses 74 and 76 to bear against faces 78 of catchers 54, and adjusting screws 80 are provided to drive adjusting blocks 72 and catchers 54 outwardly against elastic bands 70. Holders 56 are made of insulative material which may be any available reinforced plastic board.

In operation, ink in manifold 20 flows downwardly through orifices 26 forming two rows of streams which break up into two curtains of drops. These drops then pass through two rows of charge rings 86 in charge ring plate 50 and thence into one of the catchers 54 or onto the print medium which may be a moving web of paper. Switching of drops between "catch" and "deposit" trajectories is accomplished by electrostatic charging and deflection as hereinafter described. Coordinated printing capability is achieved by staggering the two rows of streams in accordance with the teachings of Taylor et al U.S. Pat. No. 3,560,641.

Formation of drops is closely controlled by application of a constant frequency, controlled amplitude, stimulating disturbance to each of the fluid streams emanating from orifice plate 18. Disturbances for this purpose may be set up by operating transducer 28 to vibrate probe 30 at constant amplitude and frequency against plate 18. This causes a continuing series of bending waves to travel the length of plate 18; each wave producing a drop stimulating disturbance each time it passes one of the orifices 26. Dampers 22 prevent reflection and repropagation of these waves. Accordingly each stream comprises an unbroken fluid filament and a series of uniformly sized and regularly spaced drops all in accordance with the well known Rayleigh jet breakup phenomenon.

As each drop is formed it is exposed to the charging influence of one of the charge rings 86. If the drop is to be deflected and caught, an electrical charge is applied to the associated charge ring 86 during the instant of drop formation. This causes an electrical charge of opposite polarity to be induced in the tip of the fluid filament and carried away by the drop. As the drop traverses the deflection field set up between ribbon 52 and the face of the adjacent catcher it is deflected to strike and run down the face of the catcher, where it is ingested, and carried off. For this purpose, the ribbon 52 may have an electrical potential of approximately −1100 volts applied thereto. Drop ingestion may be promoted by application of a suitable vacuum to the ends 90 of catchers 54. When drops are to be deposited on the web, no electrical charge is applied to the associated charge rings.

Appropriate charges for accomplishment of the above mentioned drop charging are induced by setting up an electrical potential difference between orifice plate 18 (or any other conductive structure in electrical contact with the coating fluid supply) and each appropriate charge ring 86. These potential differences are created by grounding plate 18 and applying appropriately timed voltage pulses to wires 92 in connectors 94 (only one connector illustrated). Connectors 94 are plugged into receptacles 96 at the edge of charge ring plate 50 and deliver the mentioned voltage pulses over printed circuit lines 98 to charge rings 86. A computer control circuit shown diagrammatically at 100 provides the appropriate charging potentials to wires 92 and also provides a deflection potential to deflection electrode 52.

Charge ring plate 50 is fabricated from insulative material and charge rings 86 are merely coating of conductive material lining the surfaces of orifices in the charge ring plate. Voltage pulses for the above purpose may be generated by circuits of the type dsclosed in Taylor et al, and wires 92 receiving these pulses may be matched with charge rings 86 on a one-to-one basis. Alternatively the voltage pulses may be multiplexed to decrease the number of wires and connectors. For such an alternative embodiment solid state demultiplexing circuits may be employed to demultiplex the signals and route the pulses to the proper charge rings. Such solid state circuits may be manufactured by known methods as a permanent part of charge ring plate 50.

Deflection of those drops which are to be caught is accomplished by setting up appropriate electrical fields between deflection ribbon 52 and each of the catchers 54. In the preferred embodiment, the catchers 54 are grounded and a deflection potential applied to ribbon 53, thereby setting up a pair of equal strength, oppositely directed electrical deflection fields. It is necessary that drops be charged negatively in order to be caught where the ribbon 52 is maintained at a negative potential. However, it is also possible to obtain mutual outward deflection of the two curtains of drops by charging the drops positively and applying a positive potential to ribbon 52.

It has been found that many of the shorts which occur between the deflection electrode 52 and surrounding printer structure are of extremely short duration. Such shorts will generally correct themselves within a 20 μ sec. period. To terminate printer operation at the occurrence of every brief drop of the deflection potential would therefore needlessly reduce the effectiveness of the ink jet printer. In order to detect relatively long duration shorts and to provide for rapid recovery of the deflection field after the cessation of the more brief deflection electrode shorts, the present invention includes a unique power supply and control circuit.

Figure 2:
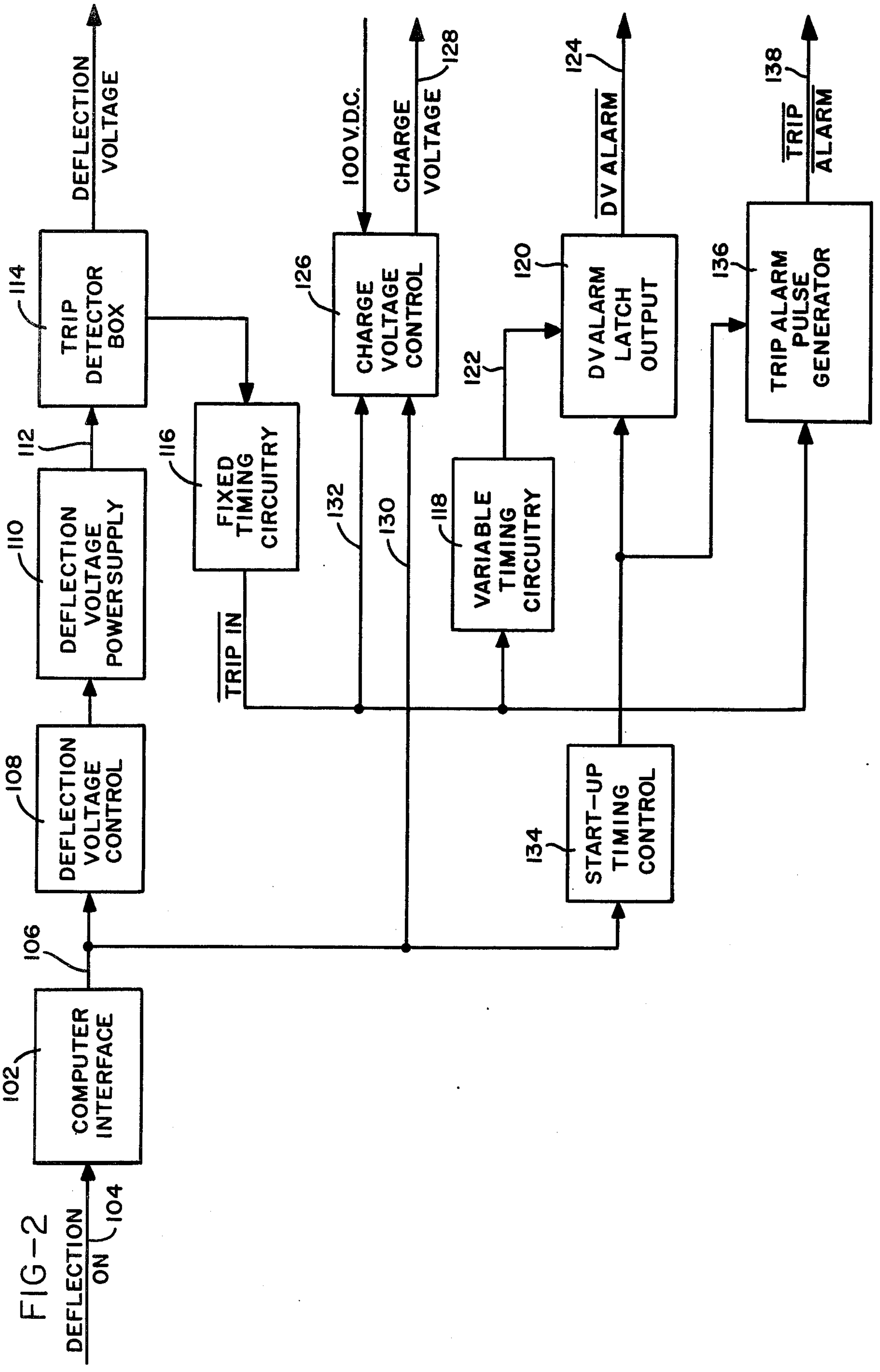
FIG. 2 is a block diagram illustrating the power supply and monitor circuit of the present invention.

FIG. 2 illustrates the printer control configuration of the present invention in diagrammatic form. A computer interface circuit 102 receives input signals on line 104 for controlling the deflection potential supply circuit. The computer interface 102 provides an output on line 106 to a means for applying an operating potential to the deflection electrode means, including deflection voltage control 108 and deflection voltage power supply 110. The output of power supply 110 is applied to the deflection electrode via a cable 112.

A means for monitoring the potential of the deflection electrode during operation of the printer and for providing an alarm signal when the deflection electrode potential drops below a predetermined level for a preselected period of time includes a trip detector box 114, which may conveniently be located adjacent the deflection electrode; a fixed timing circuit 116, responsive to the output from the trip detector box 114; a variable timing circuit 118; and a deflection voltage alarm latch output circuit 120. The fixed timing circuit 116 and the variable timing circuit 118 are responsive to the trip detector box 114 and provide a signal to the alarm latch output 120 indicating a drop in the deflection electrode potential below a predetermined potential after receipt of an output from the trip detector box 114 for a preselected time period. When the variable timing circuit 118, which provides a means for adjusting the preselected time period, provides an output on line 122 to the alarm latch 120, an output signal is applied to line 124 which is connected to the control computer. An output on line 124 will signal the computer to terminate print operations.

A charge voltage control circuit 126 receives a 100 volt DC potential and provides power to the charge electrode control circuitry via line 128, unless disabled by the computer via line 130 or by an output from the fixed timing circuit 116 on line 132. It should be noted that the charge electrode circuitry is disabled as soon as the fixed timing circuit 116 has detected a short having a duration exceeding its timing cycle, tyically 20 ρsec. The deflection electrode will not have its deflection voltage removed until both the fixed timing circuit 116 and the variable timing circuit 118 have timed through their delay cycles. The variable timing circuit 118 may be adjusted to provide a timing delay of between 5 μsec. and 5msec. The charge electrode circuitry is shut down more quickly for two reasons. First, the power supply for this circuit has the potential of supplying a greater and therefore more damaging current; secondly, the charge electrode circuitry may be brought back up to its operating potential almost instantaneously, unlike the slowly responding deflection electrode circuitry.

Start up timing control 134, responsive to the computer interface 102, delays operation of alarm latch output 120 and trip alarm pulse generator 136 until the deflection electrode has reached its normal operating potential, thereby preventing a premature alarm output during initial start up of the printer. The trip alarm pulse generator 136 provides an alarm output on line 138 indicating the occurrence of a deflection electrode short exceeding 20 μsec. in duration. The output of generator 136 may be monitored to determine the actual frequency of deflection electrode shorts.

Figure 3A:
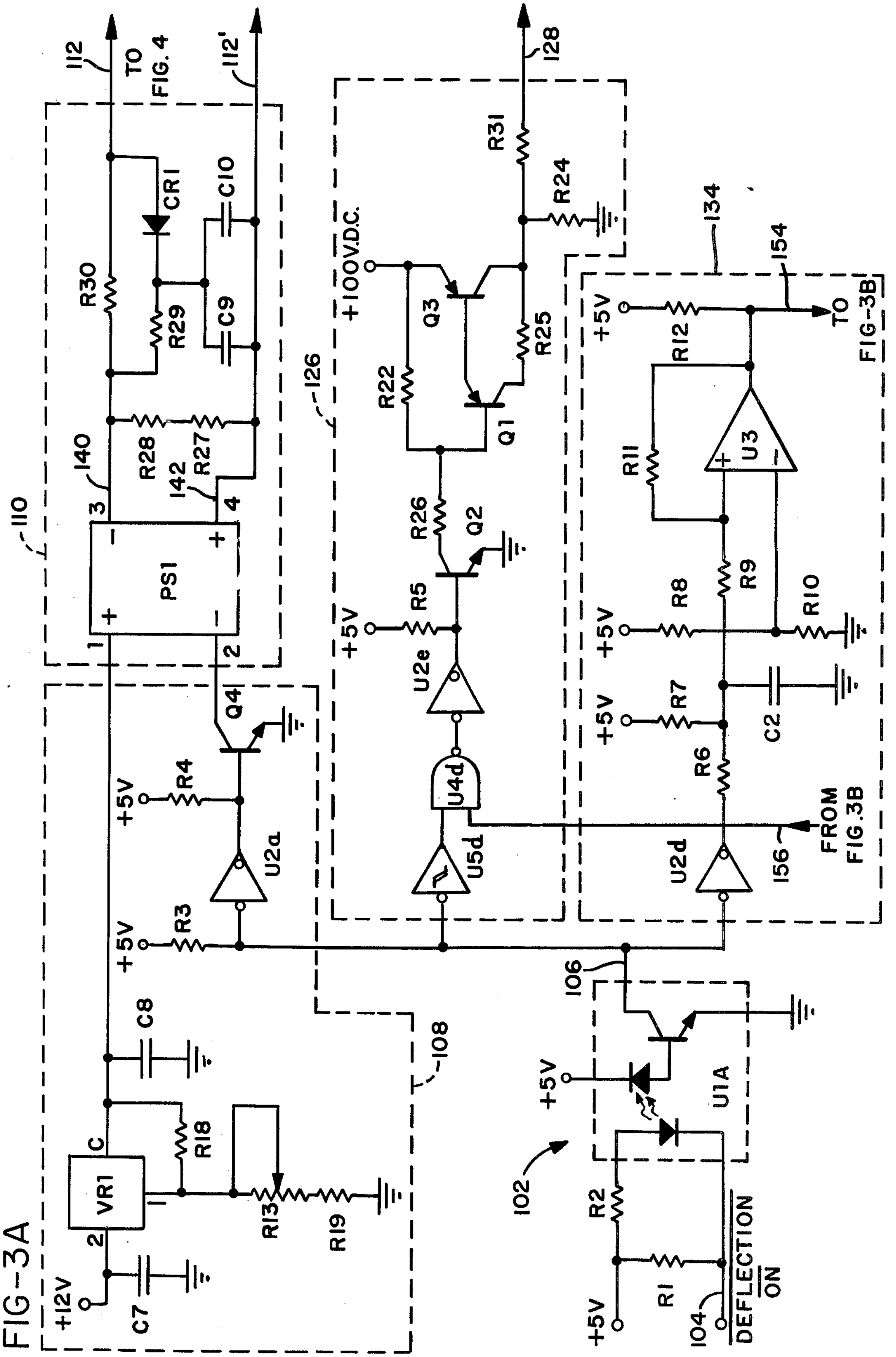
FIGS. 3A and 3B, when assembled, illustrate schematically a portion of the circuit of the present invention.
Figure 3B:
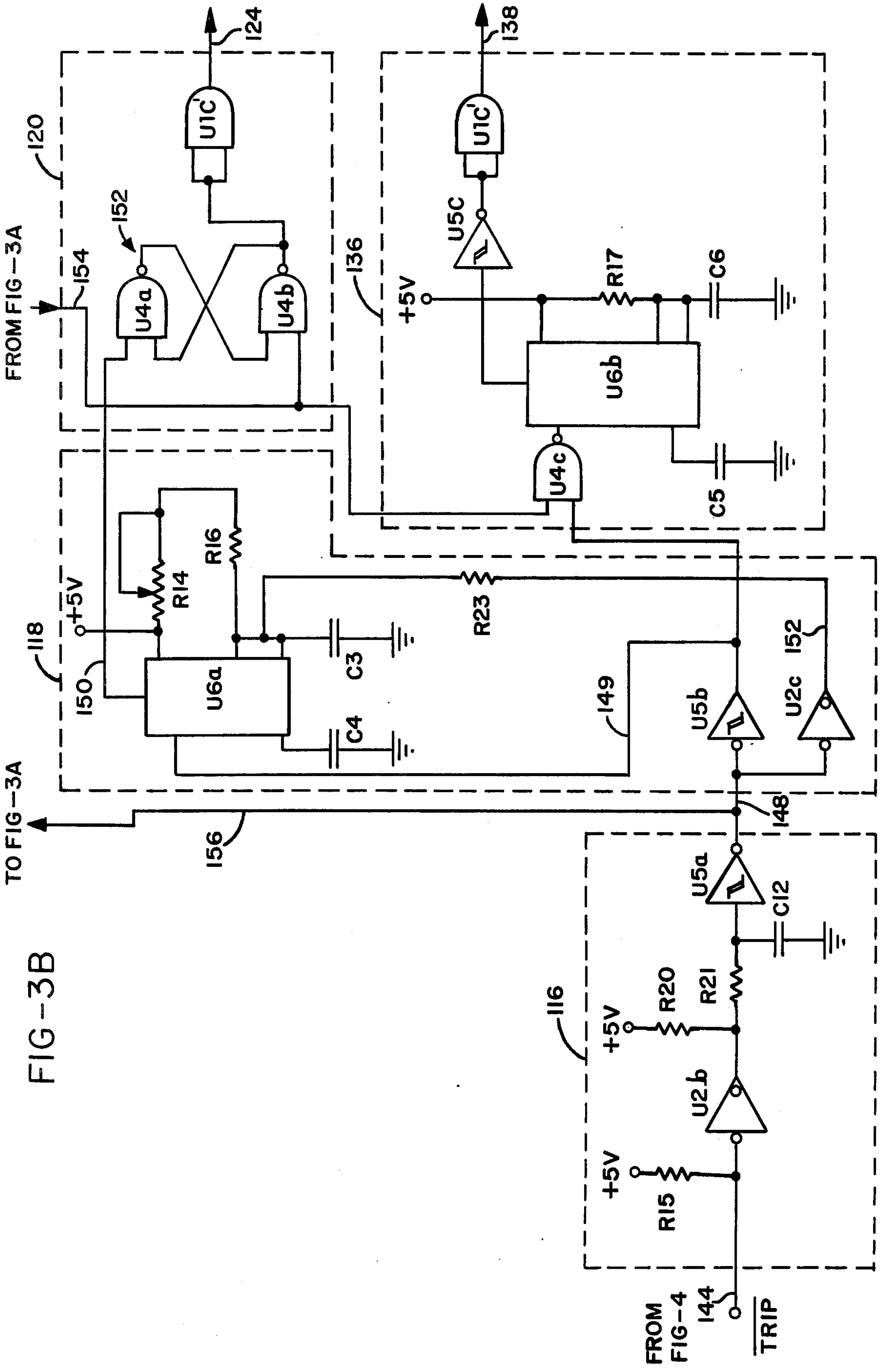
Figure 4:
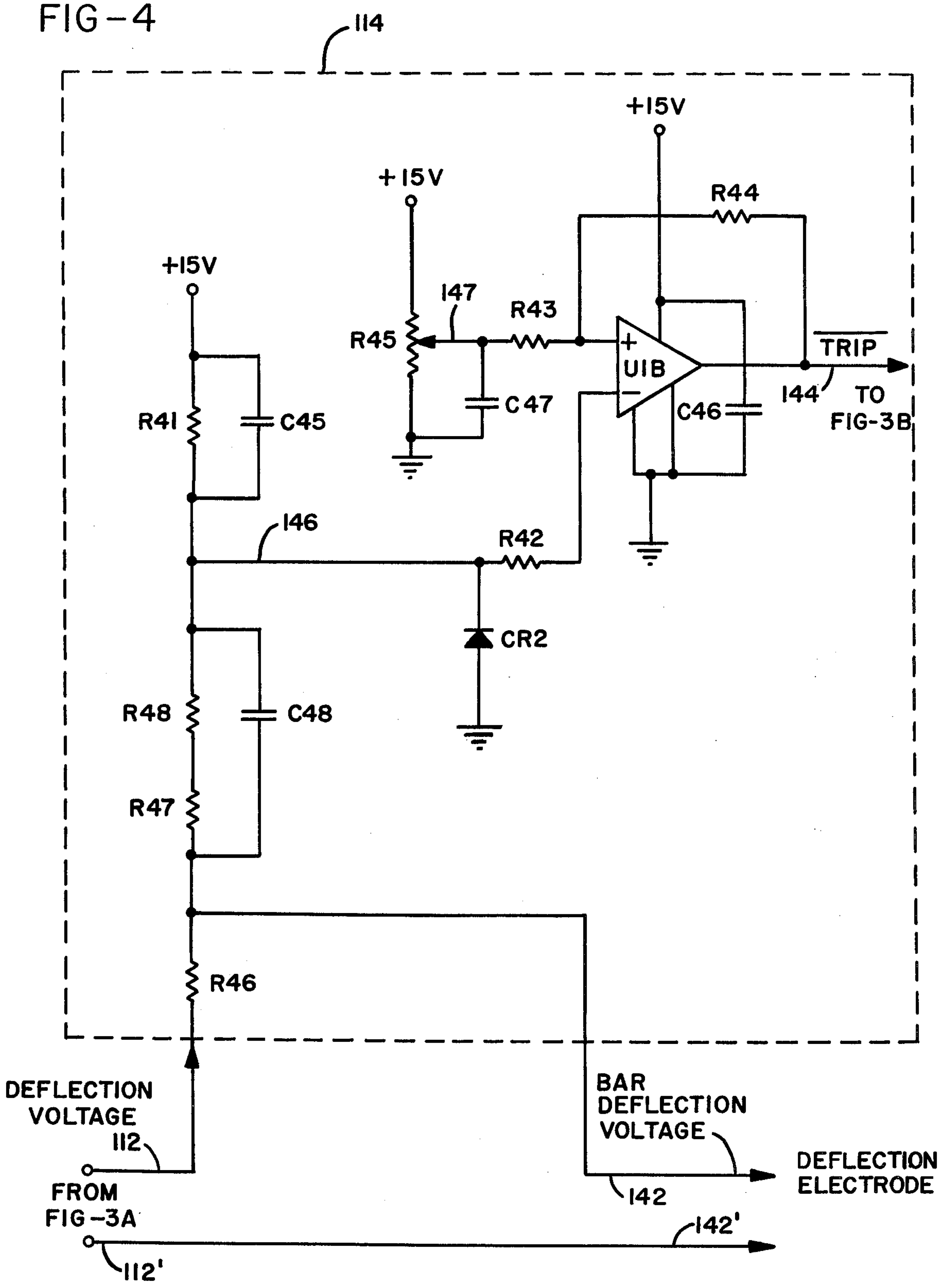
FIG. 4 illustrates a further portion of the circuit of the present invention.

Reference is now made to FIGS. 3A and 3B which, when assembled, illustrate the circuit in greater detail in conjunction with FIG. 4. The computer interface circuit 102 generally includes an optical isolator U1A and resistors R1 and R2. When line 104 receives a LOW signal from the computer, current will pass through R2 causing the optical isolator U1A to ground line 106, providing an indication that the deflection electrode is to receive the appropriate deflection potential. Resistor R2 limits the input current to isolator U1A. Resistor R1 helps protect U1A from becoming reverse biased and provides a more closely matched line termination for the computer. When line 104 receives a HIGH signal, no current will flow through resistor R2 and the line 106 will be pulled up through resistor R3.

Deflection voltage control 108 receives the LOW going signal on line 106, indicating that a deflection potential is to be applied to the deflection electrode. The output of U2*a*, an open collector inverter, will go HIGH when its input goes LOW, allowing resistor R4 to drive Q4 into saturation. Q4 will then connect the negative input of the power supply PS1 to ground, as required for operation of the power supply. The input of voltage regulator VR1 is connected directly to a 15 volt DC supply. A reference voltage is applied across resistors R18, R13 and R19 to control the voltage output of regulator VR1. Capacitors C7 and C8 provide improved transient response. The regulated voltage supply output is applied to the positive input of power supply PS1 and will be approximately 7–12 volts.

Power supply circuit 110 provides a negative deflection potential to cable 112 which in turn is connected to the deflection electrode through the trip detector circuit 114. Output 112' is a grounded output, connected to the cable shield. Power supply PS1 has a pair of output terminals 140 and 142 which are connected to a capacitor means including capacitors C9 and C10. The power supply is capable of generating up to −1500 volts DC from a 12 volt DC input. The output of power supply PS1 is current limited by resistor R30. Capacitors C9 and C10, connected to the power supply output terminals 140 and 142, charge to the potential of the power supply output through a capacitor charge circuit including resistor R29 when the printer is operating normally. The capacitors C9 and C10 provide this stored potential to cable 112 in the event of a short to ground from the deflection electrode. Thus these capacitors help the power supply PS1 act as a relatively stiff power supply which rapidly returns the deflection ribbon to its ordinary operating potential. It will be appreciated that diode CR1 will be reverse biased during charging of capacitors C9 and C10 and will remain reverse biased as long as the potential across the capacitors is less than that of the deflection electrode.

Should there occur a short to ground of the deflection electrode, diode CR1 will become forward biased, connecting capacitors C9 and C10 in parallel with the supply cable 112 and providing an added source of deflection potential thereto. Resistor R29 is chosen as a relatively large resistance value to limit the charging current to the capacitors and to prevent the power supply PS1 from being loaded down during a recharging operation. The values of C9, C10 and R46 (FIG. 4) are chosen to provide a time constant which guarantees availability of adequate deflection voltage for at least 1 msec. after the occurrence of a short. Further, the value of R46 is chosen to be large enough to inhibit sustained arcing and limit current when a short occurs. If the short circuit terminates in less than 1 msec. the recovery time for the deflection potential will be less than 5 μsec. Resistors R27 and R28 provide a discharge path for capacitors C9 and C10 after the circuit is turned off.

Trip detector box 114, which monitors the potential of the deflection electrode during operation of the printer is illustrated in greater detail in FIG. 4. As mentioned previously, the circuitry of FIG. 4 may advantageously be located adjacent the deflection electrode in order to monitor the voltage drop at the electrode. The circuit 114 receives the deflection voltage on line 112 and 112' (connected to the cable shield) and provides the bar deflection potential on lines 142 and 142'. A $\overline{\text{TRIP}}$ signal is sent back to the circuit of FIGS. 3A and 3B on line 144, indicating the detection of a drop in the deflection electrode potential below the predetermined potential level, which potential level may be adjusted.

Resistor R46 is a current limiting resistor which prevents the maximum transient current from exceeding 24 ma. at the deflection electrode when a short occurs. A voltage divider, consisting of resistors R41, R47 and R48 and compensating capacitors C45 and C48, reduces the deflection voltage to a low level signal which is applied to line 146. This voltage is compared with a reference voltage in comparator U1B. Capacitors C45 and C48 compensate the voltage divider at high frequencies. Diode CR2 prevents the input signal on line 146 from dropping below −0.6 volts. The predetermined potential level at which the $\overline{\text{TRIP}}$ signal output is provided is set by resistors R45. Capacitor C47 filters the reference potential which is coupled to UB1 through R43.

When the deflection potential is greater (more negative) than the predetermined potential level, the input on line 147 to U1B will be more positive than the input on line 146, thus causing the output of UB1 to go HIGH, indicating normal printer operation. When a bar short occurs and the deflection potential approaches ground potential level, the input on line 146 will become more positive than that on line 147, causing the output of UB1 to go LOW. A deflection electrode short will therefore be indicated.

As discussed previously, when the deflection electrode potential drops below the predetermined potential set by resistor R45, the comparator U1B provides a $\overline{\text{TRIP}}$ signal output on line 144 which is applied to the fixed delay circuit 116 (FIG. 3B). The duration of the deflection electrode short, as timed by circuit 116, determines the action taken by the circuitry to minimize the effect of the short. A short with a duration of 20 μsec. (the timing period of circuit 116) or less will be ignored. The amount of ink which would be spilled onto the print web during this period of time would be extremely small, typically less than one row of drops. When the $\overline{\text{TRIP}}$ signal at line 144 goes low, the open collector inverter U2*b* will permit capacitor C12 to be charged through resistors R20 and R21. Capacitor C12 is connected to the input of U5a, a Schmitt trigger inverter. Inverter U5a reshapes the distorted waveform and supplies it to line 148 after the voltage across capacitor C12 reaches a specified potential level, typically 1.7 volt. This will occur only when the $\overline{\text{TRIP}}$ signal on line 144 goes LOW and remains LOW for the time determined by the RC time constant of resistors R20 and R21 and capacitor C12. If the $\overline{\text{TRIP}}$ signal goes LOW for a period of time exceeding 20 μsec., the line 148 will go LOW for the same period of time, less 20 μsec.

The output on line 148 is supplied to the variable timing circuit 118. This circuit is functionally similar to circuit 116 except that the timing cycle of variable delay circuit 118 may be adjusted. Under normal operating conditions line 148 will be HIGH, making the outputs of U5b and U2c low. U6 is a monostable multivibrator which is triggered by a LOW signal on line 149. Since line 149 is normally LOW, multivibrator U6 will be triggered and a HIGH output applied to line 150. The duration of the output on line 150 is determined by the time constant of resistors R14, R16 and capacitor C3. When capacitor C3 has charged to a predetermined potential level, U6 will terminate the HIGH output on line 150. During normal operation of the printer, however, inverter U2c will clamp the line 152 at ground potential, thus preventing capacitor C3 from charging. Since multivibrator U6 cannot time out, the output 150 remains HIGH indefinitely and no alarm will be generated.

Approximately 20 μsec. after the occurrence of a deflection ribbon short, the line 148 will go LOW, causing U2c to unclamp timing capacitor C3. If the line 148 stays LOW for a time period sufficient to permit U6 to time out, output line 150 will go LOW and will trigger the alarm output circuit 120, and described below. However, if the line 148 should go HIGH before the timing cycle of circuit 118 has been completed, the output of inverter U2*c* will once again go LOW and C3 will discharge through R23. The time period of the multivibrator U6 is set by adjusting R14.

The output from the multivibrator U6 on line 150 will latch NAND gate latch 152, consisting of gates U4a and U4*b*. A signal will therefore be applied to line 124 when the latch is set, indicating that the deflection voltage has remained below the predetermined potential level for the preselected time period set by the fixed and variable timing circuitry. The signal on line 124 is supplied to the computer so that printer operation may be shut down.

When printer operation is initiated, it is clear that a period of time will be required to bring the deflection potential up to the desired operating potential. The alarm output circuitry is therefore disabled for a period of time which is set by start up control circuit 134. When the input of U2d goes LOW, the capacitor C2 is permitted to charge slowly to a 5 volt potential through resistor R7. The voltage across capacitor C2 is compared to a reference voltage provided by a voltage divider consisting of R8 and R10. The output of comparator U3, line 154, will go HIGH a period of time after the computer initiates printer operation. Until line 154 goes HIGH, the alarm circuitry will be disabled. The delay provided by the start up timing control 134 will be approximately 35 msec.

A trip alarm pulse generator circuit 136 includes a NAND gate U4c which is responsive to the output of inverter U5b and also to the output 154 of the start up timing control circuit 134. When both of the inputs to U4c go HIGH, indicating the detection of a deflection electrode short persisting more than 20 μsec., which short occurs after the initial 35 msec. start up period, the monostable multivibrator U6' will be triggered to apply a negative going pulse output on line 138. These pulses may be monitored to determine the frequency of occurrence of deflection electrode shorts.

As explained previously, the charge voltage control circuit 126 is provided for disabling the charge electrode immediately upon the detection of a deflection electrode short which persists for a period of time greater than 20 μsec. The output of fixed timing circuit 116 is provided on line 156 to a NAND gate U4*d*, which gate also receives an input from inverter U5*d*. When the printer is operating normally, both line 156 and the output of inverter U5*d* will be HIGH. The output of gate U4d will, therefore, be LOW causing inverter U2e to permit transistor Q2 to be switched on. The Darlington amplifier circuit including transistors Q1 and Q3 will therefore be turned on, connecting the 100 volt DC supply to line 128. Should either of the inputs to NAND gate U4d go LOW, indicating that either the computer has switched off the deflection electrode power supply or that the deflection electrode has experienced a short of a duration exceeding 20 μsec., transistor Q2 will be switched off immediately and power removed from line 128.

The following is a listing of component values:

| | |
|---|---|
| R1 | 470 ohms |
| R2 | 470 ohms |
| R3 | 470 ohms |
| R4 | 220 ohms |
| R5 | 1K ohms |
| R6 | 150 ohms |
| R7 | 47K ohms |
| R8, R10 | 10K ohms |
| R9 | 10K ohms |
| R11 | 1M ohms |
| R12 | 1K ohms |
| R13 | 1K ohms |
| R14 | 500K ohms |
| R15 | 470 ohms |
| R16 | 470 ohms |
| R17 | 100K ohms |
| R18 | 220 ohms |
| R19 | 1K ohms |
| R20 | 560 ohms |
| R21 | 150 ohms |
| R22 | 15K ohms |
| R27, R28 | 22M ohms |
| R29 | 10M ohms |
| R24 | 47K ohms |
| R25 | 100 ohms |
| R26 | 33K ohms |
| R30 | 820K ohms |
| R31 | .47 ohms |
| R23 | 150 ohms |
| C3-C6 | .01μf |
| C7 | .01μf |
| C2 | 1.0μf ± 20% |
| C8 | 1.0μf |
| C9, C10 | .05μf |
| C12 | 0.1μf ± 20% |
| CR1 | Diode, 1N4257 |
| CR2 | Diode, 1N4001 |
| R41 | 200K ohms |
| R42 | 10K ohms |
| R43 | 10K ohms |
| R44 | 1M ohms |
| R45 | 5K ohms |
| R46 | 56K ohms |
| R47, R48 | 10M ohms |
| C47, C46 | .01μf |
| C45 | 470pf |
| C48 | 4.7pf |

While the form of apparatus herein described constitutes a preferred embodiment of the invention, it is to be understood that the invention is not limited to this precise form of apparatus and that changes may be made therein without departing from the scope of the invention.

What is claimed is:

1. An ink jet printer for depositing ink drops on a print medium, comprising means for forming a jet stream of ink drops directed at the print medium, means for charging drops in said jet stream, deflection electrode means, adjacent said stream, for providing a drop deflecting electrical field when a non-zero operating potential is applied thereto, said drops passing through said field prior to striking the print medium, and means for applying a non-zero operating potential to said deflection electrode means, including:

a power supply having a pair of output terminals, deflection electrode supply cable means, connected to said deflection electrode means, and capacitor means, connecting said power supply output terminals to said deflection electrode supply cable means, for charging to the potential of said power supply output when said printer is operating normally and for providing the stored potential to said supply cable means in the event of a short to ground of said deflection electrode means, whereby the period of time needed for said deflection electrode means to return to its non-zero operating potential is substantially reduced.

2. An ink jet printer according to claim 1 in which said capacitor means comprises a capacitor, a capacitor charge circuit connecting said capacitor across said power supply output terminals, and a capacitor discharge circuit connecting said capacitor in parallel with said supply cable means when said deflection electrode means is shorted to ground.

3. An ink jet printer according to claim 2 in which said capacitor charge circuit comprises a resistance in series with said capacitor connecting one of said pair of output terminals of said power supply to said capacitor, and means connecting said capacitor to the other of said pair of output terminals of said power supply.

4. The ink jet printer of claim 2 in which said capacitor discharge circuit comprises a diode connecting said capacitor in parallel with said supply cable means when said diode is forward biased, during the occurrence of a short to ground of said deflection electrode means.

5. In an ink jet printer for depositing ink drops on a print medium having a means for generating a plurality of jet streams of ink drops, each stream directed toward said print medium, means for selectively charging drops in said drop streams, deflection electrode means, positioned adjacent said drop streams, for providing a deflection field causing the charged drops to be deflected, and means for providing a deflection potential to said deflection electrode, the improvement comprising:

means for monitoring the potential of said deflection electrode during operation of said printer and for providing an alarm signal when the deflection electrode potential drops below a predetermined level for a preselected period of time.

6. In a computer controlled ink jet printer in which charged ink drops are deflected by a deflection field resulting from a deflection electrode to which is applied a non-zero deflection potential, a circuit for providing said non-zero deflection potential to said deflection electrode and for monitoring the operation of said electrode comprising:

means for providing a deflection potential to said deflection electrode, capacitor means, connected to said deflection electrode, for providing an additional potential source for said deflection electrode in the event of a short from said deflection electrode to ground, deflection electrode potential monitor means for monitoring said deflection electrode potential and for providing an output signal in response to the reduction of said deflection electrode potential below a predetermined potential, delay means, responsive to said deflection electrode monitor means, for providing a signal to said computer indicating a drop in said deflection electrode potential below said predetermined potential after receipt of an output from said deflection electrode potential monitor means for a preselected time period, and computer interface means for providing computer control signals to said means for providing said deflection electrode deflection potential such that said means for providing deflection electrode deflection potential is disabled.

7. The circuit of claim 6 in which said delay means includes means for adjusting said preselected time period.

8. The circuit of claim 6 in which said deflection electrode potential monitor means includes means for adjusting said predetermined potential.

9. An ink jet printer, controlled by a computer control circuit, for depositing ink drops on a print medium, comprising:

means for generating a stream of ink drops, deflection electrode means for providing a deflection field through which said drops pass for separating drops into at least two trajectories, means for catching the drops in one of said at least two trajectories such that the caught drops do not strike the print medium, power supply means for providing an operating deflection potential to said deflection electrode means, capacitor means, connected in parallel with said power supply means, for providing an additional source of potential to said deflection electrode means when the potential of said deflection electrode means drops below said operating deflection potential, voltage monitor means for monitoring the potential of said deflection electrode means and for providing an output when the potential of said deflection electrode means drops below a predetermined potential level, and alarm delay means, responsive to said output of said voltage monitor means, for providing an alarm signal to said computer control circuit after the potential of said deflection electrode means remains below said predetermined potential level for a preselected time period such that said computer control circuit will disable said ink jet printer, whereby short duration shorts from said deflection electrode means to ground will not affect printer operation but shorts which persist for a period greater than said preselected period of time will result in the disablement of said ink jet printer and damage to said printer will thereby be prevented.

* * * * *